US009654611B2

(12) United States Patent
Ilmonen et al.

(10) Patent No.: US 9,654,611 B2
(45) Date of Patent: May 16, 2017

(54) APPLICATION SHARING BETWEEN DEVICES IN PROXIMITY TO EACH OTHER

(71) Applicant: MULTITOUCH OY, Helsinki (FI)

(72) Inventors: Tommi Ilmonen, Espoo (FI); Giulio Jacucci, Espoo (FI); Petri Martikainen, Helsinki (FI)

(73) Assignee: Multitouch Oy, Helsinki (FI)

( * ) Notice: Subject to any disclaimer, the term of this patent is extended or adjusted under 35 U.S.C. 154(b) by 0 days.

(21) Appl. No.: 14/785,537

(22) PCT Filed: May 21, 2013

(86) PCT No.: PCT/FI2013/050552
§ 371 (c)(1),
(2) Date: Oct. 19, 2015

(87) PCT Pub. No.: WO2014/188050
PCT Pub. Date: Nov. 27, 2014

(65) Prior Publication Data
US 2016/0065717 A1    Mar. 3, 2016

(51) Int. Cl.
*H04W 12/08* (2009.01)
*H04M 1/725* (2006.01)
*H04W 4/00* (2009.01)

(52) U.S. Cl.
CPC ..... *H04M 1/72525* (2013.01); *H04M 1/7253* (2013.01); *H04W 4/003* (2013.01); *H04W 12/08* (2013.01); *H04M 2250/12* (2013.01)

(58) Field of Classification Search
CPC ........... H04M 1/7253; H04M 2250/12; H04M 1/72525; H04W 12/08; H04W 4/003
USPC .................... 455/41.1, 41.2, 410, 411, 456.1
See application file for complete search history.

(56) References Cited

U.S. PATENT DOCUMENTS

| | | | |
|---|---|---|---|
| 2007/0124503 A1 | 5/2007 | Ramos et al. | |
| 2011/0081923 A1* | 4/2011 | Forutanpour | G06F 1/1694 455/457 |
| 2011/0252317 A1 | 10/2011 | Keraenen et al. | |
| 2014/0082610 A1* | 3/2014 | Wang | G06F 9/445 717/178 |

OTHER PUBLICATIONS

International Preliminary report on Patentability in PCT/FI2013/050552, parent application.

* cited by examiner

*Primary Examiner* — Sam Bhattacharya
(74) *Attorney, Agent, or Firm* — Shalom Wertsberger; Saltamar Innovations

(57) ABSTRACT

A method and an apparatus comprising operating a processor of an apparatus as a first processor and/or as a second processor. The method at a first processor comprises recognizing the proximity of a second apparatus; recognizing a first user input and in response to the user input, sending an application share invitation to the second apparatus. The method at a second processor comprises recognizing the proximity of a first apparatus and in response to receiving an application share invitation from the first apparatus, displaying a security prompt for the user on the display.

28 Claims, 7 Drawing Sheets

APPLICATION SHARING BETWEEN DEVICES IN PROXIMITY TO EACH OTHER

TECHNICAL FIELD

The present invention generally relates to control of electronic devices. The invention relates particularly, though not exclusively, to application sharing between devices.

BACKGROUND ART

Control and user interfaces of electronic devices such as tablet computers are increasingly based on the use of touch sensitive displays and applications downloaded, installed and run on the devices.

Users of the device often wish to enhance their user experience by adding e.g. a social interaction to the use of the device. This is done for several purposes, for example in order to share important data or in order to enjoy entertaining content for mutual pleasure.

As the application content and operating systems of current electronic devices are widely customizable, and often dependent on the choices of user and/or the manufacturer, a seamless way of sharing between separate devices is envisaged.

SUMMARY

According to a first example aspect of the invention there is provided an apparatus comprising:
a display;
a memory; and
a processor;
wherein the processor is configured to:
operate as a first processor and/or as a second processor; wherein
the processor as a first processor is configured to:
cause recognizing the proximity of a second apparatus;
cause recognizing a first user input; and
in response to the user input to cause sending an application
share invitation to the second apparatus;
and wherein
the processor as a second processor is configured to:
cause recognizing the proximity of a first apparatus;
in response to receiving an application share invitation from the first apparatus, to cause displaying of a security prompt for the user on the display.

The processor as a second processor may be further configured to in response to the user accepting the application share invitation by the security prompt, to cause detecting whether the application is stored in the memory and executable by the processor.

The processor as a second processor may be further configured in response to the user accepting the application share invitation by the security prompt, to store information on the acceptance into the memory for subsequent use.

The processor as a second processor may be further configured to in response to detecting the application being executable, to cause executing the application.

The processor as a second processor may be further configured in response to the application not being executable, to cause downloading the application and subsequently cause executing the application.

The processor may be further configured to in response to the application being executed in both the first and the second apparatus, to cause displaying a content shared by both the first and the second apparatus on the display.

The processor may be further configured to in response to the application being executed in both the first and the second apparatus, to cause displaying a part of the content shared by both the first and the second apparatus on the display.

The first user gesture may comprise sliding an icon of an application towards the second apparatus.

The first user gesture may comprise sliding an application being executed towards the second apparatus.

The first user gesture may comprise enlarging an icon or an application in such a way that it reaches the boundary of the second apparatus.

The second apparatus may run a different operating system to that being run by the first apparatus.

The processor as a second processor may be further configured to in response to receiving the application share invitation, to cause checking the compatibility of the application with the operating system of the second apparatus.

The processor as a first processor may be further configured to:
cause recognizing the proximity of a plurality of second apparatuses; and
in response to the user input to cause sending an application share invitation to at least a part of the plurality of second apparatuses.

The display may comprise a touch sensitive display.

According to a second example aspect of the invention there is provided a method comprising:
operating a processor as a first processor and/or as a second processor; wherein
the method at a first processor comprises:
recognizing the proximity of a second apparatus;
recognizing a first user input; and
in response to the user input, sending an application share invitation to the second apparatus;
and wherein
the method at a second processor comprises:
recognizing the proximity of a first apparatus;
in response to receiving an application share invitation from the first apparatus, displaying a security prompt for the user on the display.

The method at a second processor may further comprise in response to the user accepting the application share invitation by the security prompt, detecting whether the application is stored in a memory and executable by the processor.

The method at a second processor may further comprise in response to the user accepting the application share invitation by the security prompt, storing information on the acceptance into a memory for subsequent use.

The method at a second processor may further comprise in response to detecting the application being executable executing the application.

The method at a second processor may further comprise in response to the application not being executable, downloading the application and subsequently executing the application.

The method may further comprise in response to the application being executed in both the first and the second apparatus, displaying a content shared by both the first and the second apparatus on the display.

The method may further comprise in response to the application being executed in both the first and the second apparatus, displaying a part of the content shared by both the first and the second apparatus on the display.

The first user gesture may comprise sliding an icon of an application towards the second apparatus.

The first user gesture may comprise sliding an application being executed towards the second apparatus.

The first user gesture may comprise enlarging an icon or an application in such a way that it reaches the boundary of the second apparatus.

The second apparatus may run a different operating system to that being run by the first apparatus.

The method at a second processor may further comprise in response to receiving the application share invitation, checking the compatibility of the application with the operating system of the second apparatus.

The method at a first processor may further comprise:
recognizing the proximity of a plurality of second apparatuses; and
in response to the user input, sending an application share invitation to at least a part of the plurality of second apparatuses.

The display may comprise a touch sensitive display.

According to a third example aspect of the invention there is provided a computer program comprising computer code for causing performing the method of the second example aspect of the invention.

According to a fourth example aspect of the invention there is provided a memory medium comprising the computer program of the third example aspect of the invention.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which.

DETAILED DESCRIPTION

In the following description, like reference signs denote like elements.

Figure 1:
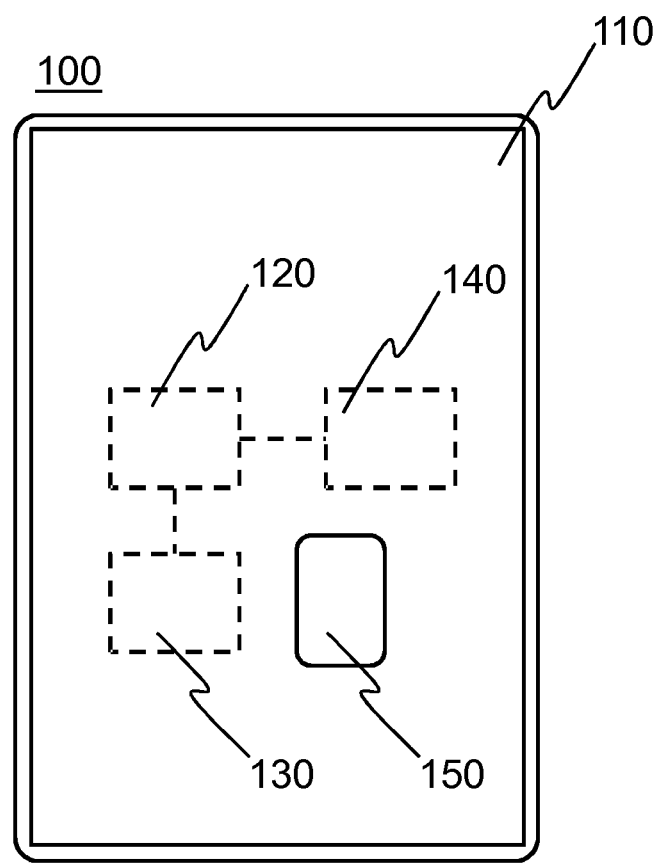
FIG. 1 shows a schematic block diagram of an apparatus according to an example embodiment of the invention.

FIG. 1 shows a schematic block diagram of an apparatus 100 according to an example embodiment of the invention. The apparatus is for example an electronic device with a user interface, such as a computer, a television, a tablet computer, a smartphone, an e-book-reader or a media player. The apparatus 100 comprises a display 110 for displaying various types of content such as applications, or apps, 150, media, and user interface elements. The apparatus 100 comprises a processor 120 configured to provide and/or control the functionality of the apparatus 100, and a memory 130 functionally coupled to the processor 120, for storing data and software, i.e. apps, executable by the processor. The apparatus further comprises a proximity detection element 140, functionally coupled to the processor 120, for detecting the proximity of a second apparatus. The proximity detection element comprises for example communication interfaces such as a wireless communication interface or short range radio communication interface, or sensors, such as magnetic sensors. In a further example embodiment, the proximity detection element is integrated with or into the processor 120 and/or to further elements of the apparatus 100.

A skilled person appreciates that, in a further example embodiment, the apparatus 100 comprises further elements (not shown), such as sensors or detectors, communication units, or further user interface elements such as a keyboard, hardware or software buttons, touch sensitive displays or surfaces, slider controls or switches. Furthermore, the apparatus comprises, in a further example embodiment, further elements (not shown), such as further user interface elements, microphones, speakers, and/or camera units.

In an embodiment, the display 110 of FIG. 1 is a touch sensitive display. The touch sensitive display 110 comprises, for example, a touch sensor for detecting the touch and/or gestures of the user, e.g. with a finger or a stylus, on or in proximity thereof. The touch sensor is implemented for example using any of a resistive, a surface acoustic wave, a capacitive—such as a surface capacitance, a projected capacitance, a mutual capacitance, or self-capacitance—an infrared, an optical, a dispersive signal and/or acoustic pulse recognition touch sensor or an array thereof. Alternatively, or in addition to the touch of the user, the user interface can be operated by a pointing device such as a mouse, a keyboard or a touchpad.

FIGS. 2 to 9 show schematic representations of a first and second apparatus according to an example embodiment of the invention and their functions according to example embodiments of the invention. It is to be noted that the first apparatus 100 and the second apparatus 200 are both apparatuses according to an embodiment of the invention, the processor 120 of which apparatuses is configured to operate as a first processor and/or as the second processor in order to carry out functions in the role of the first apparatus 100 or the second apparatus 200. Hereinafter the term first apparatus is used to refer to an apparatus, the processor of which operates as a first processor, i.e. to the sending, or in some example embodiments the master, apparatus. Accordingly, hereinafter the term second apparatus is used to refer to an apparatus, the processor of which operates as a second processor, i.e. to the receiving, or in some example embodiments the slave, apparatus. It is to be noted that all functions and/or operations described are executed by the processor 120 of the first 100 or the second 200 apparatus, i.e. the processor of the first 100 and/or second 200 apparatus is configured to cause carrying out the function and/or operations.

Figure 2:
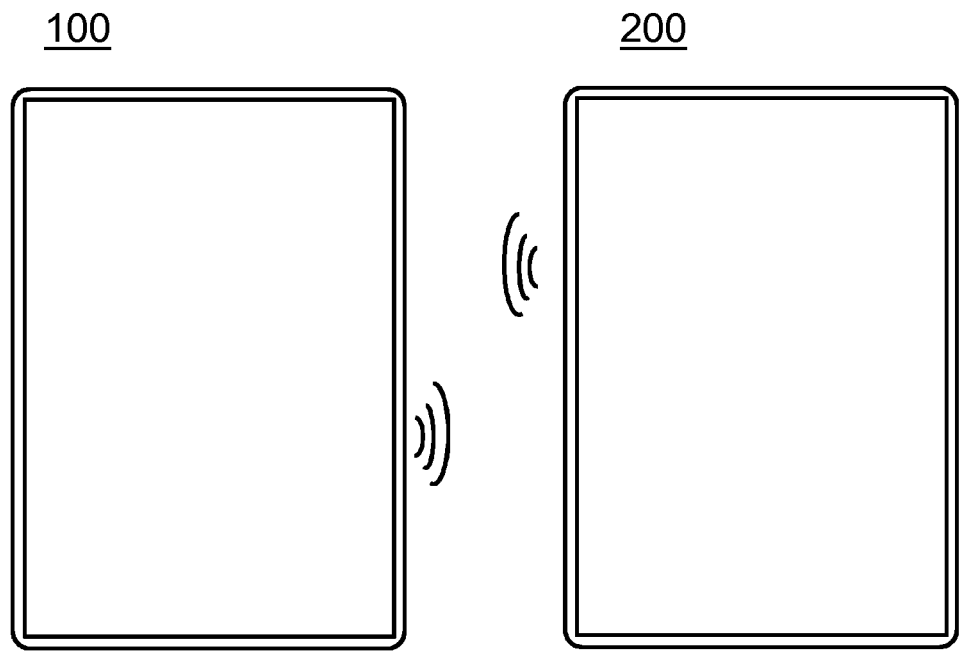
FIGS. 2 to 9 show schematic representations of a first and second apparatus according to an example embodiment of the invention and their functions according to example embodiments of the invention.

FIG. 2 shows the first apparatus 100 and the second apparatus 200 being brought to proximity of each other. The proximity is understood to mean physical closeness and in an example embodiment the first and second apparatus are preconfigured to a certain proximity limit, for example physical touching of the devices or the devices being within a certain distance of each other. In a further example embodiment, the user of the device defines a setting for the proximity limit for each situation separately or a default setting for all situations.

As the first and second apparatus are brought to proximity of each other the processor of both the first 100 and the second 200 apparatus is configured to cause recognizing the proximity of the other apparatus. The recognition is, in an example embodiment, carried out using proximity sensors, such as magnetic, optical, electrical or mechanical sensors, or by using communications protocols such as Bluetooth, wireless local area network (WLAN), radio frequency identification (RFID) or near field communication (NFC). In a further example embodiment, the proximity recognition is carried out using imaging, by imaging the apparatus in proximity or a code such as a QR-code or bar-code imprinted thereon, or by using position detection with systems such as global positioning system (GPS). In a further example embodiment, the first 100 and second 200 apparatus are connected with a hardware link, such as a universal serial bus (USB) cable.

In an example embodiment, the proximity recognition function is active at all times, or alternatively it may be activated and deactivated by the user of the apparatus.

Figure 3:
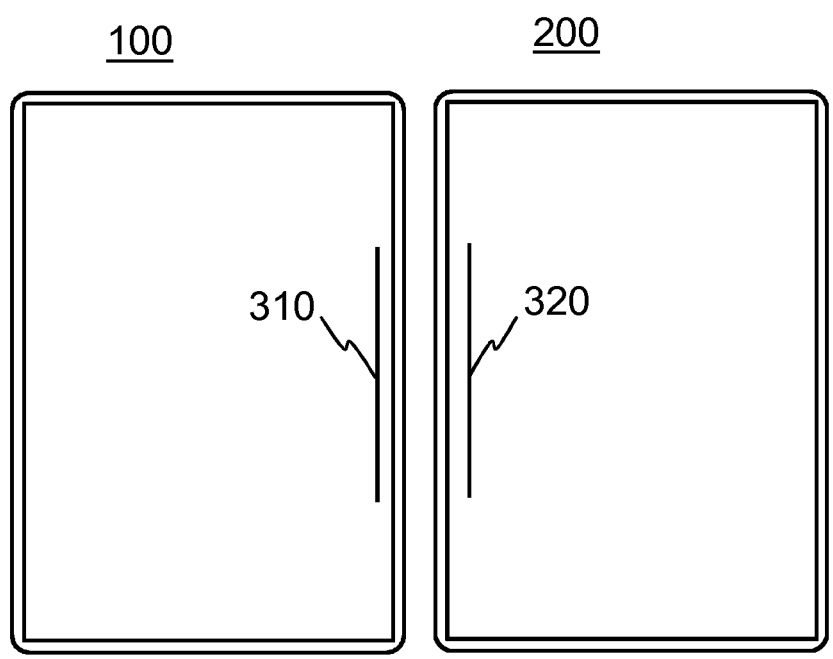

FIG. 3 shows a schematic representation of a first 100 and second 200 apparatus according to an example embodiment of the invention as the proximity recognition has been completed. The displays of both the first 100 and the second 200 apparatus show a display object, or a symbol, 310,320 indicating that the proximity of another apparatus has been recognized. In a further example embodiment, the symbols on the displays are similar or different, or only the display of the first or the second apparatus displays the symbol. In addition or alternative to a symbol being displayed, a further indication is given to the users, for example using audio or tactile indication.

Figure 4:
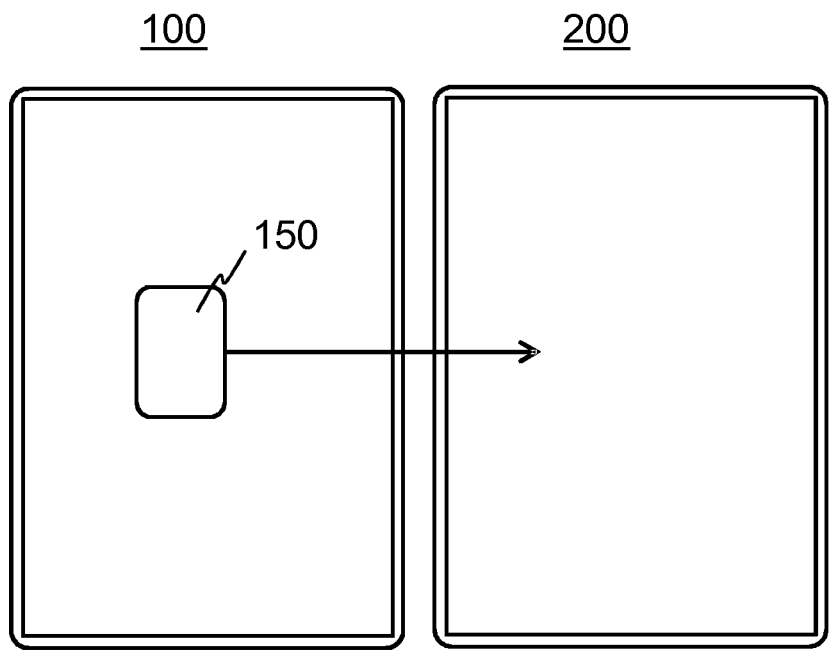

FIG. 4 shows a schematic representation of a first 100 and second 200 apparatus according to an example embodiment, the first apparatus 100 having an application, or app, 150, the icon of which is shown on the display of the first apparatus 100. Alternatively, the app 150 is being executed by the processor of the first apparatus and the content of the application is shown on the display of the first apparatus 100. The user of the first apparatus 100 wishes to share the app 150, or some content therein, with the user of the second apparatus 200. In order to do so, the user of the first apparatus 100 slides or pushes the application towards the second apparatus 200, i.e. provides a first user input or user gesture. In an example embodiment, the sliding is carried out with a touch sensitive display, i.e. by sliding for example a finger on or above the touch sensitive display of the first apparatus 100. In a further example embodiment, the direction of the sliding gesture points towards the second apparatus 200, if for example a plurality of second apparatuses 200 are in proximity of the first apparatus 100. In a further example embodiment, for example the speed of the sliding gesture determines the distance of the slide, if for example a plurality of second apparatuses 200 is in the proximity of the first apparatus 100 in the same direction but on different distances therefrom. In a still further example embodiment, the direction of the slide gesture is defined in three dimensions, e.g. by using arcuate gestures or taps. In a further example embodiment, the gesture is performed by enlarging the object 150 in such a way that its edges would cover one or more apparatuses 200. The enlarging gesture is hereinafter also referred to as a slide gesture, as the gesture slides the edge of object 150 to the area of another apparatus 200.

Figure 5:
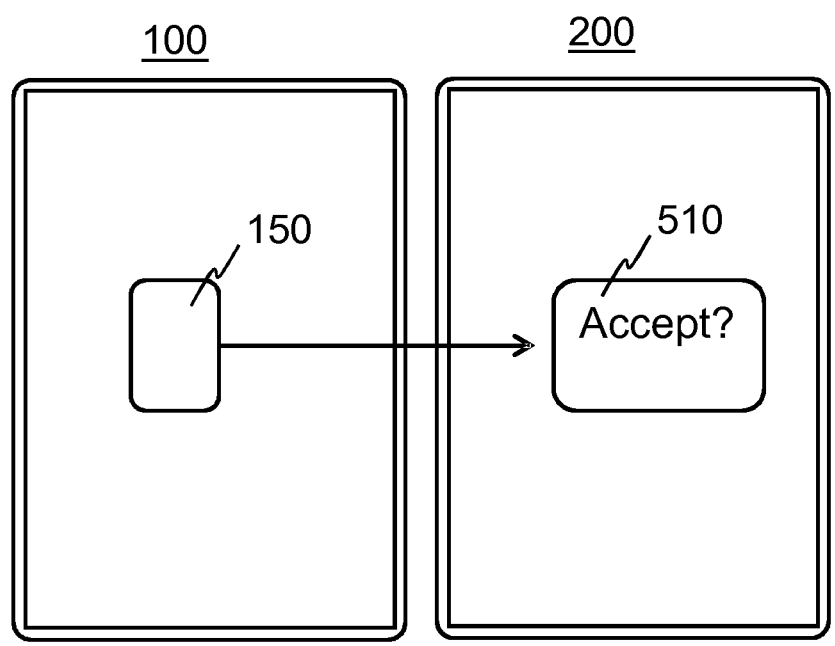

FIG. 5 shows a schematic representation of a first 100 and second 200 apparatus according to an example embodiment after the app 150 has been pushed or slid into the second apparatus 200. The display of the second apparatus 200 shows a prompt 510, e.g. a small window, a notification bar or a button, enquiring the user of the second apparatus 200 to approve the sharing of the app 150 that has been slid from the first apparatus 100. In an example embodiment, the user either accepts or declines the app sharing by giving input using e.g. a touch sensitive display. In a further example embodiment, the user of the second apparatus 200 is presented with further choices, either by default, or to be opened from a further display object such as a further menu. The further choices comprise for example accepting the sharing of the app 150 only once or accepting all future sharing from the first apparatus 100, i.e. pairing the two apparatuses or choosing a trusted status from one or more alternative trust levels to the first apparatus 100. The pairing or trusted status is in an embodiment stored in the memory of the second apparatus 200 or in the memory of both the first 100 and the second 200 apparatus. In addition or alternatively the further choices comprise for example blocking all sharing from the first apparatus 100 in the future, or accepting sharing from the first apparatus 100 for a given period of time. In a further example embodiment, the user of the second apparatus is presented with further information about the sharing of the app 150, for example information on the app 150, the version thereof, the identity of the user of the first apparatus 100, or on the configuration of the first apparatus 100.

Figure 6:
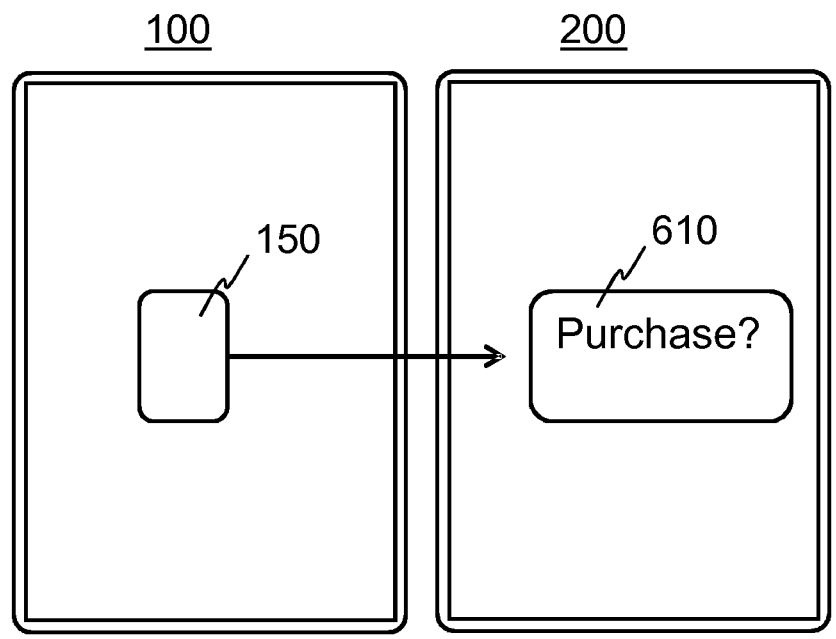

FIG. 6 shows a schematic representation of a first 100 and a second 200 apparatus according to an example embodiment after the user of the second apparatus has approved sharing the app 150 that has been pushed or slid into the second apparatus 200. After approval, the second apparatus 200 determines, or detects, whether the app 150 to be shared exists in the second apparatus 200, e.g. in the memory thereof. If the app 150 is present in the second apparatus 200, the app is automatically executed in an example embodiment, or the display object for executing the application, e.g. an icon thereof, is highlighted, for example by making it move or making it bigger, thus indicating to the user the possibility of executing the app 150. It is to be noted that the second apparatus 200 and the first apparatus 100 in an example embodiment run different operating systems.

If the app 150 is not present in the second apparatus 200, the second apparatus 200 determines whether the app 150 is compatible with the operating system of the second apparatus 200, whether the app 150 is available for download for example in an application store or a similar location, and whether the app 150 is free or must be purchased. The second apparatus accordingly presents the user with a prompt 610. If the app 150 is incompatible with the second apparatus 200, the user is so informed. If the app 150 is available for download, the user is prompted to authorize or decline the download and/or the purchase. In a further example embodiment, since the user of the first apparatus 100 has already purchased the application, she is able to allow the user of the second apparatus 200 to download and use the application for free indefinitely or for a limited time, e.g. by providing a license number to the user of the second apparatus automatically with the sharing or manually afterwards. After the user of the second apparatus 200 has approved the download and/or purchase, the app 150 will be downloaded, installed and available to be executed as hereinbefore described. In a further example embodiment, the user of the first apparatus 100 has received a right for side-by-side use of the app 150, for purposes of use with connected apparatuses. In such a case the user of the second apparatus 200 does not need to purchase a license to run the application when operated in conjunction with the first apparatus 100.

Figure 7:
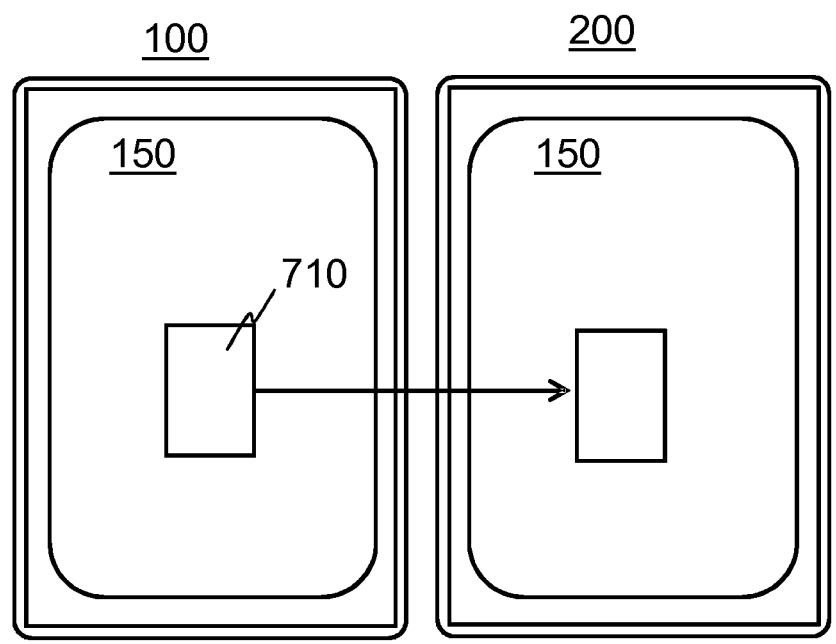

FIG. 7 shows a schematic representation of a first 100 and a second 200 apparatus according to an example embodiment and the shared app 150 being executed on both apparatuses. The first 100 and the second 200 apparatus display either a similar view of the app 150, share the same view of the app 150 or both apparatus display a view of the app 150 in accordance with the preferences, the operating system, or the version of the app 150 in each apparatus. As the app 150 is being executed in the first 100 and the second 200 apparatus, the users can exchange objects 710, e.g. files, app specific objects, or media, from one apparatus to another. The exchange is effected by pushing or sliding the objects in a manner similar to that of app sliding or pushing as described hereinbefore. It should be noted that the exchange of objects is applicable in both directions although not shown in FIG. 7.

Figure 8:
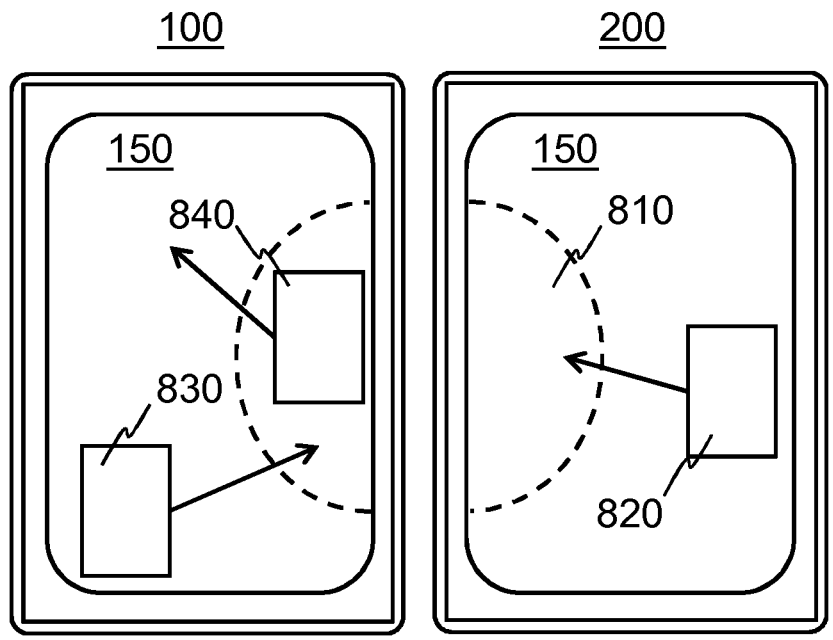

FIG. 8 shows a schematic representation of a first 100 and second 200 apparatus according to an example embodiment and the shared app 150 being executed on both apparatuses. In addition to showing a view of the app 150 as hereinbefore described, the first 100 and the second 200 apparatus display automatically, or in response to user input, a shared app area 810. With the shared app area 810 displayed in both the first 100 and the second 200 apparatus, the users can exchange objects 820,830 840, e.g. files, app specific objects, or media, from one apparatus to another and/or create a shared object collection. The exchange is effected by pushing or sliding the objects into the shared app area 810 in a manner similar to that of app sliding or pushing as described hereinbefore. It should be noted that the exchange of objects is applicable in both directions although not shown in FIG. 8.

Figure 9:
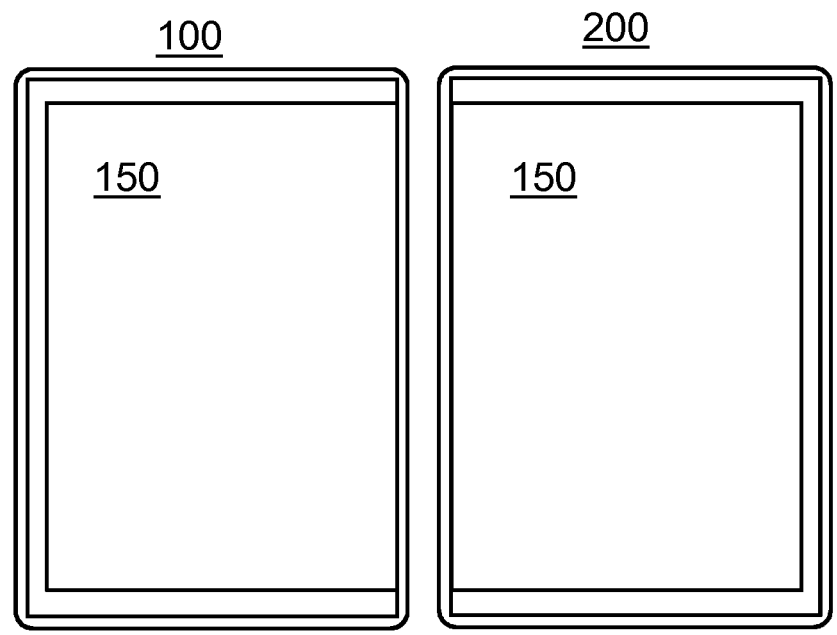

FIG. 9 shows a schematic representation of a first 100 and a second 200 apparatus according to an example embodiment, and the shared app 150 being executed on both apparatuses. The shared app 150 is spread to the display of both the first 100 and the second 200 apparatus, thus making the display surface area available for the app larger, e.g. for purposes of viewing a document or media such as video in a larger size. In an example embodiment, the user interface of both apparatuses is used to control the app 150, or alternatively the user interface of either the first 100 or the second 200 apparatus has control, i.e. one of the first 100 and the second 200 apparatus is a master apparatus and the other one a slave apparatus.

Figure 10:
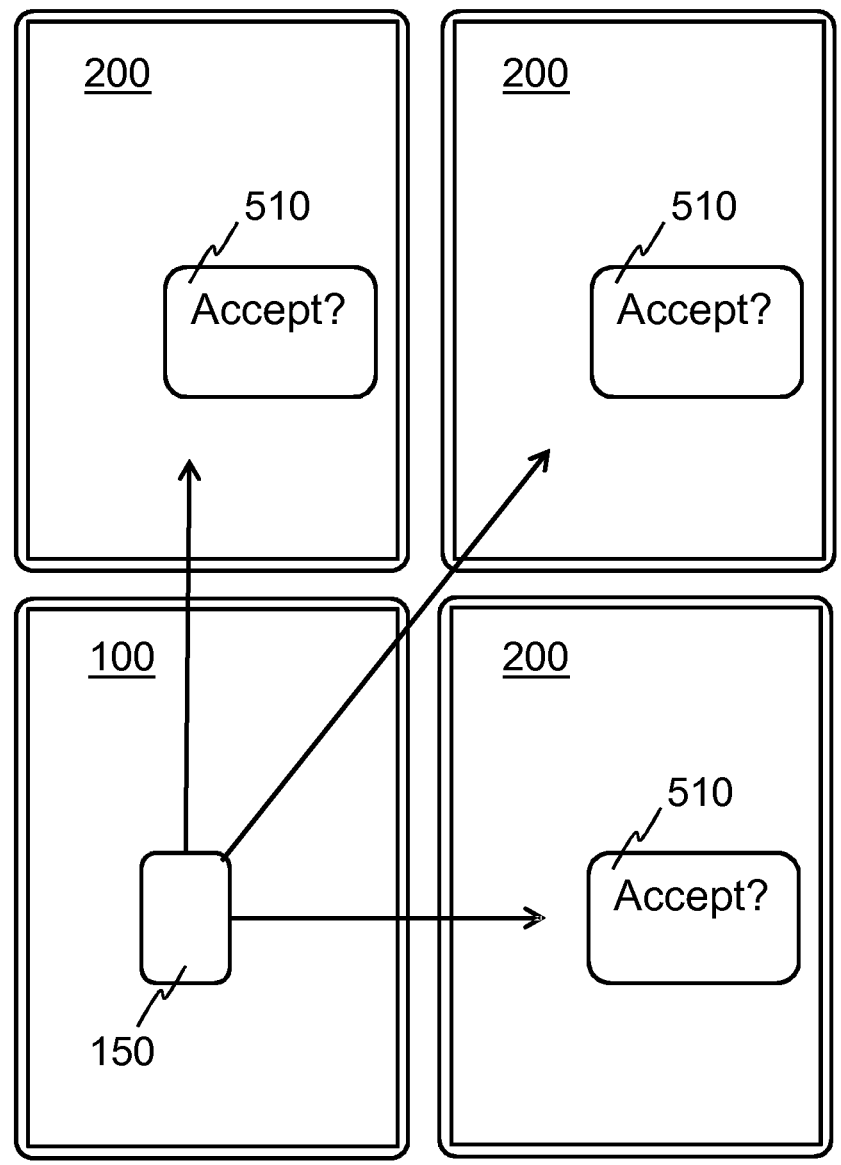
FIG. 10 shows a schematic representation of a first and a plurality of second apparatuses according to an example embodiment of the invention and their functions according to an example embodiment of the invention.

FIG. 10 shows a schematic representation of a first and a plurality of second apparatuses according to an example embodiment of the invention and their functions according to an example embodiment of the invention. The app 150 to be shared is pushed or slid to each second apparatus 200 as hereinbefore described with a single second apparatus 200. Each second apparatus 200 carries out the functionalities hereinbefore described. Furthermore, it is to be noted that each apparatus may have a similar, shared, or its own view of the app 150 as hereinbefore described or the app 150 can be spread to the displays of each apparatus. In an example embodiment, if the first apparatus 100 leaves the proximity of the plurality of second apparatuses 200, the second apparatuses 200 continue to share the application 150, or the user of a second apparatus 200 of the plurality of the second apparatuses can define that the sharing is terminated, if the first apparatus leaves the group. In a further example embodiment, each second apparatus 200 exchanges content only via the first apparatus 100, or each second apparatus 200 exchanges content also with other second apparatuses 200. In a further example embodiment, each apparatus in the group approves or declines sharing with each further apparatus.

Figure 11:
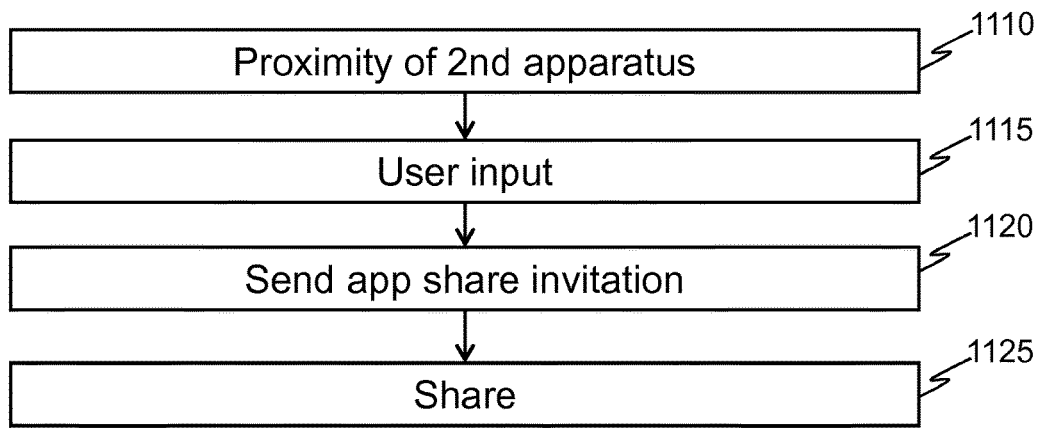
FIGS. 11 and 12 show flow diagrams of methods according to example embodiments of the invention.
Figure 12:
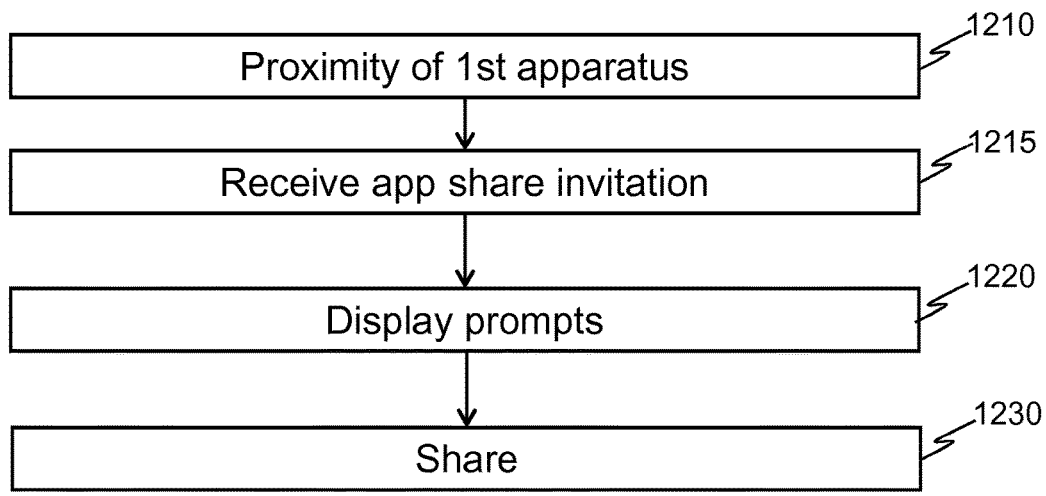

FIGS. 11 and 12 show flow diagrams of methods according to example embodiments of the invention.

FIG. 11 shows the method according to example embodiment of the invention at a first processor, wherein the apparatus operates as the first apparatus 100, i.e. the processor 120 of the apparatus is configured to operate as a first processor. The operations in the method are carried out as hereinbefore described. At step 1110 the proximity of a second apparatus 200, or a plurality of second apparatuses 200, is recognized. At 1115 a user input indicating app sharing is received, i.e. the user slides or pushes an application towards the second apparatus 200 and an app share invitation is sent to the second apparatus 200 with the user input at 1120. After the app sharing has been approved, the app is shared at 1125.

FIG. 12 shows the method according to example embodiment of the invention at a second processor, wherein the apparatus operates as the second apparatus 200, i.e. the processor 120 of the apparatus is configured to operate as a second processor. The operations in the method are carried out as hereinbefore described. At step 1210 the proximity of a first apparatus 100 is recognized. At 1215 an app share invitation is received and subsequently the user is prompted to accept the invitation and a possible download and/or purchase as hereinbefore described at 1220. At 1230, the app is shared, after possible download.

Some use cases relating to given example embodiments of app sharing are presented in the following.

In a first use case, a user of a device, for example a tablet computer, wishes to play a game with a friend having a tablet computer with a different operating system. In accordance with the embodiment of the invention, the users bring their devices into proximity of each other and the first user slides the game app towards the device of the second user. The user of the second device approves the sharing request, but since the game app has not been installed, it needs to be downloaded, which is also approved by the user of the second device. After the game app has been downloaded, an enjoyable game session begins with both devices executing the app and each user having on her own display a customized view of the game, in accordance with their preferences.

In a second use case, users of two devices wish to share media files with each other. In accordance with the embodiment of the invention, one of them pushes the media viewer app towards the other device and after approval both devices execute the app with a shared app area on both displays. Sharing of files with the shared app area is easy and convenient, as both users can work simultaneously on their own devices without having to constantly approve transfers of files.

In a third use case, a video is to be viewed on an electronic device. Unfortunately, the two friends wishing to do this have devices with small displays. In accordance with an embodiment of the invention, a user of one of the devices shares the video player app with the other device and the video can be spread to the display area of both devices.

In a fourth use case a plurality of large displays, such as television screens, is to be used in promotion of a product for example on a trade fair. One device, such as a laptop computer, is used in accordance with the invention to share a promotion app to all displays.

In a fifth use case, a leader of a group of people, such as a teacher or a lecturer, wishes to poll the knowledge or opinions of the people in the group, such as students, using a polling app. In accordance with the invention, the app of choice is pushed to the devices of the people in the group, who easily can respond to the poll independent of their previously purchased apps, as the first device doing the pushing may share the license to the app of choice.

Without in any way limiting the scope, interpretation, or application of the claims appearing below, a technical effect of one or more of the example embodiments disclosed herein is to provide an uncomplicated way of social content sharing for electronic devices. Another technical effect of one or more of the example embodiments disclosed herein is to liberate a user of a device from manually retrieving an app wished to be used together with a user of another device. Another technical effect of one or more of the example embodiments disclosed herein is to enable a simple cross-platform user experience. Another technical effect of one or more of the example embodiments disclosed herein is to provide a simple way of sharing rights of use to an app. Another technical effect of one or more of the example embodiments disclosed herein is to provide for platform independent screen sharing in any app.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, the sequence of operations, or a part thereof, of any example embodiment described hereinbefore can be combined to any other example embodiment described.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
a display;
a memory; and
a processor;
wherein the processor is configured to:
operate as a first processor and/or as a second processor; wherein
the processor as a first processor is configured to:
cause recognizing the proximity of a second apparatus;
cause recognizing a first user input; and
in response to the user input to cause sending an application share invitation to the second apparatus;
and wherein
the processor as a second processor is configured to:
cause recognizing the proximity of a first apparatus;
in response to receiving an application share invitation from the first apparatus, to cause displaying of a security prompt for the user on the display.

2. The apparatus of claim 1, wherein the processor as a second processor is further configured to in response to the user accepting the application share invitation by the security prompt, to cause detecting whether the application is stored in the memory and executable by the processor.

3. The apparatus of claim 1, wherein the processor as a second processor is further configured in response to the user accepting the application share invitation by the security prompt, to store information on the acceptance into the memory for subsequent use.

4. The apparatus of claim 2, wherein the processor as a second processor is further configured to in response to detecting the application being executable, to cause executing the application.

5. The apparatus of claim 2, wherein the processor as a second processor is further configured in response to the application not being executable, to cause downloading the application and subsequently cause executing the application.

6. The apparatus of claim 4, wherein the processor is further configured to in response to the application being executed in both the first and the second apparatus, to cause displaying a content shared by both the first and the second apparatus on the display.

7. The apparatus of claim 4, wherein the processor is further configured to in response to the application being executed in both the first and the second apparatus, to cause displaying a part of the content shared by both the first and the second apparatus on the display.

8. The apparatus of claim 1, wherein the first user gesture comprises sliding an icon of an application towards the second apparatus.

9. The apparatus of claim 1, wherein the first user gesture comprises sliding an application being executed towards the second apparatus.

10. The apparatus of claim 1, wherein the first user gesture comprises enlarging an icon or an application in such a way that it reaches the boundary of the second apparatus.

11. The apparatus of claim 1, wherein the second apparatus runs a different operating system to that being run by the first apparatus.

12. The apparatus of claim 11, wherein the processor as a second processor is further configured to in response to receiving the application share invitation, to cause checking the compatibility of the application with the operating system of the second apparatus.

13. The apparatus of claim 1, wherein the processor as a first processor is further configured to:
cause recognizing the proximity of a plurality of second apparatuses; and
in response to the user input to cause sending an application share invitation to at least a part of the plurality of second apparatuses.

14. The apparatus of claim 1, wherein the display comprises a touch sensitive display.

15. A method comprising:
operating a processor as a first processor and/or as a second processor; wherein
the method at a first processor comprises:
recognizing the proximity of a second apparatus;
recognizing a first user input; and
in response to the user input, sending an application share invitation to the second apparatus;
and wherein the method at a second processor comprises:
 recognizing the proximity of a first apparatus;
 in response to receiving an application share invitation from the first apparatus, displaying a security prompt for the user on the display.

16. The method of claim 15, wherein the method at a second processor further comprises in response to the user accepting the application share invitation by the security prompt, detecting whether the application is stored in a memory and executable by the processor.

17. The method of claim 15 wherein the method at a second processor further comprises in response to the user accepting the application share invitation by the security prompt, storing information on the acceptance into a memory for subsequent use.

18. The method of claim 16, wherein the method at a second processor further comprises in response to detecting the application being executable executing the application.

19. The method of claim 16, wherein the method at a second processor further comprises in response to the application not being executable, downloading the application and subsequently executing the application.

20. The method of claim 18, further comprising in response to the application being executed in both the first and the second apparatus, displaying a content shared by both the first and the second apparatus on the display.

21. The method of claim 18, further comprising in response to the application being executed in both the first and the second apparatus, displaying a part of the content shared by both the first and the second apparatus on the display.

22. The method of claim 15, wherein the first user gesture comprises sliding an icon of an application towards the second apparatus.

23. The method of claim 15, wherein the first user gesture comprises sliding an application being executed towards the second apparatus.

24. The method of claim 15, wherein the first user gesture comprises enlarging an icon or an application in such a way that it reaches the boundary of the second apparatus.

25. The method of claim 15, wherein the second apparatus runs a different operating system to that being run by the first apparatus.

26. The method of claim 25, wherein the method at a second processor further comprises in response to receiving the application share invitation, checking the compatibility of the application with the operating system of the second apparatus.

27. The method of claim 15, wherein the method at a first processor further comprises:
 recognizing the proximity of a plurality of second apparatuses; and
 in response to the user input, sending an application share invitation to at least a part of the plurality of second apparatuses.

28. The method of claim 15, wherein the display comprises a touch sensitive display.

* * * * *